Figure 1:
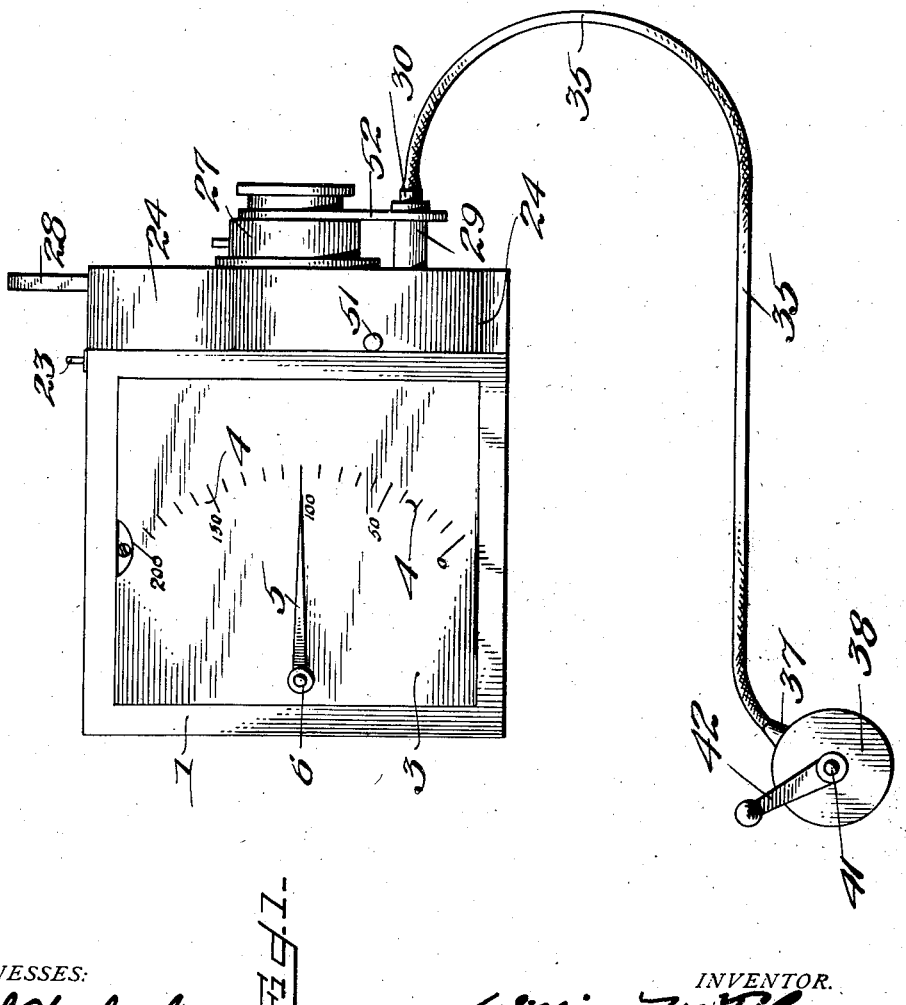

W. M. THOMAS,
CAMERA.
APPLICATION FILED APR. 29, 1914.

1,265,699.

Patented May 7, 1918.
4 SHEETS—SHEET 1.

WITNESSES:
Frank Oberkirch
E. E. Haines

INVENTOR.
William M. Thomas
BY
Robert W. Ashley
ATTORNEY.

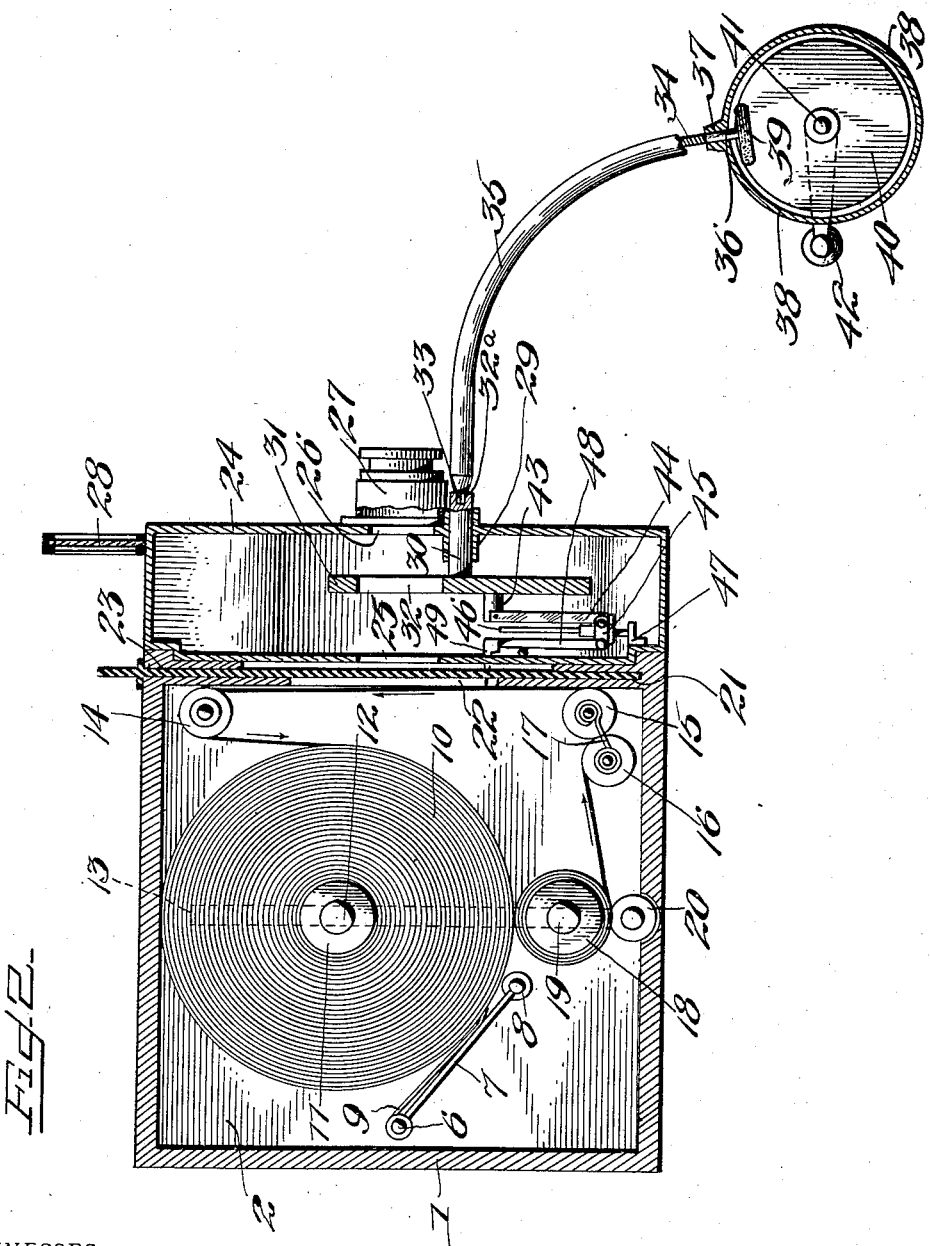

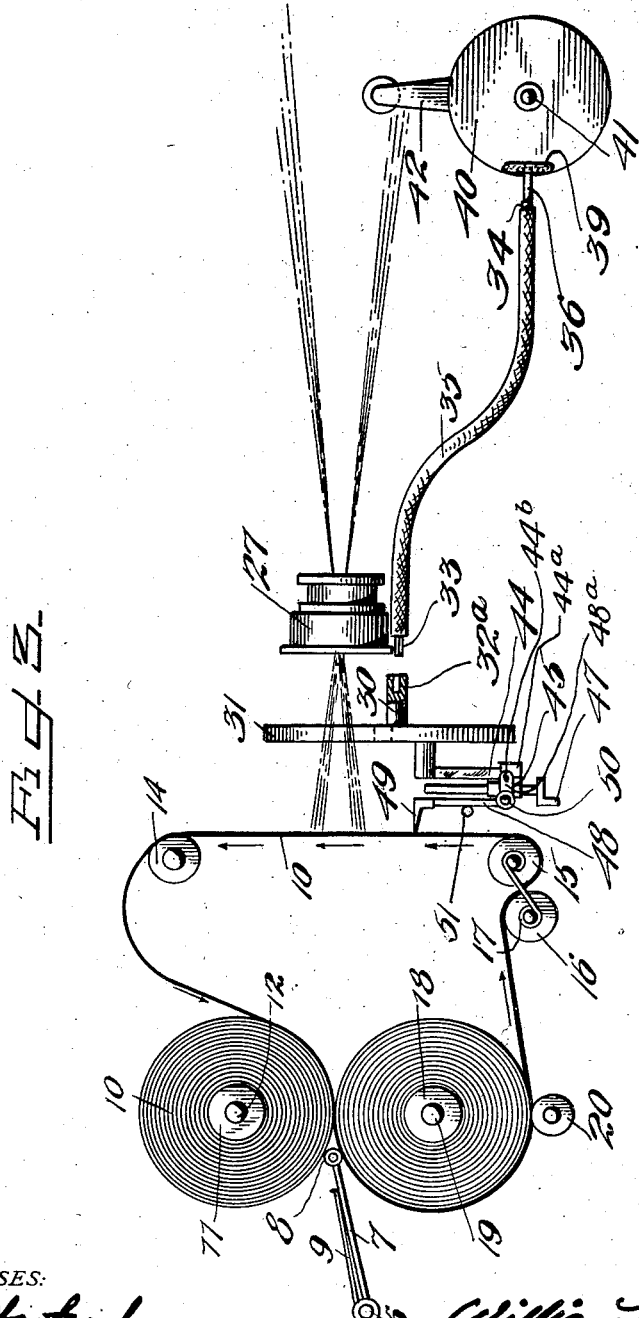

W. M. THOMAS.
CAMERA.
APPLICATION FILED APR. 29, 1914.
1,265,699.
Patented May 7, 1918.
4 SHEETS—SHEET 4.
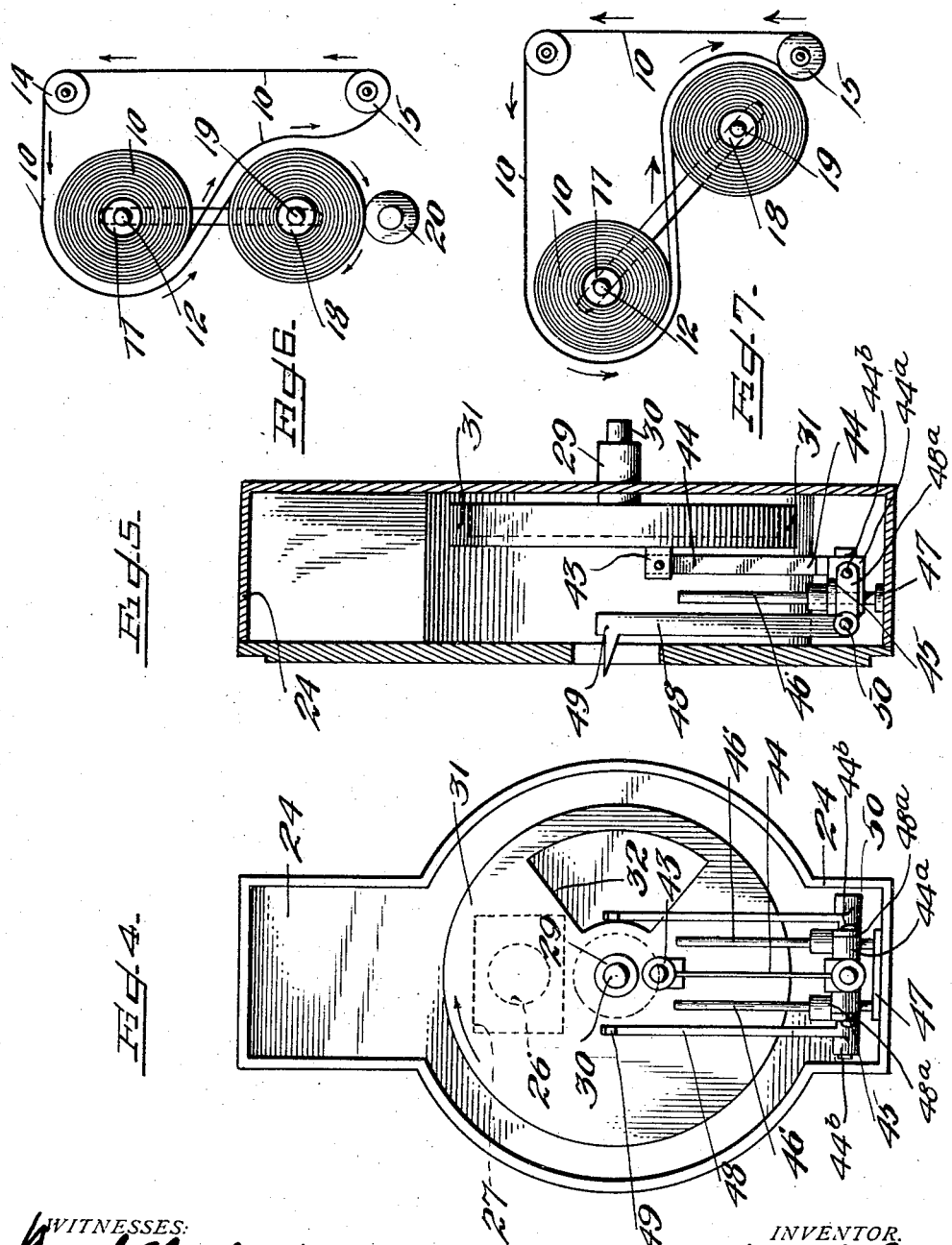

UNITED STATES PATENT OFFICE.

WILLIAM M. THOMAS, OF NEW YORK, N. Y., ASSIGNOR TO THOMAS OBERKIRCH COMPANY, LIMITED, OF NEW YORK, N. Y., A CORPORATION OF NEW YORK.

CAMERA.

1,265,699.      Specification of Letters Patent.      Patented May 7, 1918.

Application filed April 29, 1914. Serial No. 835,095.

*To all whom it may concern:*

Be it known that I, WILLIAM M. THOMAS, a citizen of the United States, residing at New York city, in the county of New York and State of New York, have invented new and useful Improvements in Cameras, of which the following is a specification.

This invention relates to moving picture apparatus and more particularly to a small portable picture camera.

The principal object of the present invention is to provide a small moving picture camera wherein the shutter and film actuating mechanism is carried in a casing to which may be attached film magazines whereby the entire camera is formed of two sections, one carrying the operating mechanism and the other carrying the supply of film.

A still further object of the present invention is a camera of the character specified wherein the film supply magazine is provided with film winding and guiding mechanisms to enable a relatively large portion of film to be stored in substantially small compass.

A still further object of the present invention is a camera of the character specified wherein the film supply magazine carries the supply spool and the rewind spool with a portion of the film extending into the zone of effective operations of the film feeding mechanism carried by the section of the casing which includes the operating mechanism.

Other and further objects of the present invention will in part be obvious and will in part be pointed out hereinafter in the specification following by reference to the accompanying drawings, wherein like characters are used to represent like parts throughout the several figures thereof.

In the drawings Figure 1 is a side elevation of the camera, illustrating in connection therewith the manually controlled means for actuating the picture taking mechanism; Fig. 2 is a longitudinal sectional view of the camera and the means for actuating same; Fig. 3 is a diagrammatical illustration of the relative elements or parts comprised in the camera structure; Fig. 4 is a front elevation of the moving picture taking apparatus with one of the covers removed; Fig. 5 is a vertical sectional view of moving picture taking apparatus actuating means; Fig. 6 is a diagrammatical illustration of a modified form of film winding means; Fig. 7 is a diagrammatical illustration of another form of film winding means.

Similar numerals of reference indicate similar parts throughout the several views.

In the drawings (1) indicates a casing provided with a stationary side wall (2) and a removable door or casement (3) having indicated on its outside face a film indicator means (4) running from a zero mark to 200 feet, the object of which is to indicate to the user of a camera the number of feet utilized during the process of taking a picture. Said removable casement (3) has mounted therein a pointer (5) for use in connection with the indicator dial. This pointer is mounted on pin (6), the opposite end of said pin (6) having mounted thereon an arm (7) provided at its end with a roller (8), the position of which is controlled by spring (9), said roller (8) being so arranged as to engage the rewound film (10) mounted on film spool (11), provided with pins (12) engaging a suitable vertical slot (13) in side wall (2) and casement (3) for permitting said film roll (10) to ride therein vertically with relation to the film magazine during the unrolling of said film while in the process of picture taking. (14) indicates a roller mounted in the upper end of said magazine (1) over which the film (10) passes from over roller (15) in the bottom of said magazine (1), after having passed over a compensating roller (16), the position of which is controlled by means of spring (17). The supply spool (18) is provided with pins (19), also operative in vertical slot (13), the rotation of said film as it is being wound from spool (18) being so arranged as to rest upon supporting roller (20) mounted or fastened in the magazine (1) in any suitable manner. The spool (18) is shown as the unwinding roller and has mounted thereon substantially 200 feet of new film and when the magazine is properly threaded the free end of the film passes over rollers (16), (15) and (14) and attached to winding spool (11), and when actuated by the claw feet of the moving picture taking actuating means, the winding roller (11) as it gathers the film, after the process of taking a picture, takes substantially the original position as far as space is concerned as did the original film roll, thereby providing a film magazine with the required film reception area provided with two roll operating means operative substantially within the same space, thereby providing a film magazine in its entirety of a very reduced size and one readily handled. The front wall (21) of magazine (1) is provided with an aperture (22) across which the film (10) extends and has mounted therein a blind slide (23) that may readily be removed therefrom when desired.

(24) indicates a casing or housing, made of any suitable material, the back wall thereof being provided with a projective aperture (25) and the front wall thereof being provided with a like aperture (26) and having mounted thereon and adjacent thereto a lens (27) operative in any suitable manner, manually or automatically. The top of casement (24) has mounted thereon a sight glass (28) for the proper positioning and alining of the camera as a whole during the focusing of the same upon an object. The front wall of casement (24) has formed thereon or mounted thereon a bearing (29) having mounted therein a shaft (30) carrying on its inside end a wheel (31) provided with an aperture (32), the outer end of said shaft (30) having formed therein a socket (32a) adapted to receive a plug (33) on one end of a flexible shaft (34) mounted in a suitable flexible casing (35). The opposite end of said flexible shaft (34) carries a rigid shaft (36) mounted in bearing (37) on casing (38), said shaft (36) having mounted thereon a flexible wheel (39) engaging a disk (40) mounted on shaft (41) in said casing (38) and operative by means of crank (42). The object of the same being to provide means for rotating the wheel or shutter (31) at the required number of revolutions manually at any point distant from the camera proper, at the proper speed which is, namely, about 16 revolutions per second. Wheel (31) has mounted therein, slightly in an eccentric position from the center thereof, a stud (43) which receives one end of spring (44) the opposite end of which is mounted in a block (44a) adjacent the sliding head (45) which is in turn mounted upon guide rods (46) and operative thereon vertically with relation thereto. The lower ends of said guide rods (46) are mounted in bracket (47) suitably fastened within the casing (24). Said sliding head (45) has mounted thereon arms (48) carrying at their upper ends claws (49) when actuated adapted to engage the small apertures in the sides of the film (10).

The arms 48 are provided at their lower ends with extensions 48a, which extensions are pivoted as at (44b) to the block (44a).

When the shaft (30) is operated to rotate the shutter (31) in the direction indicated by the arrow in Fig. 4, the stud (43) in its upward rotating movement exerts a pull upon the spring or pitman (44). This pull is communicated to the block (44a), through the pivots (44b) to the extensions (48a), whereby the first effect of this upward pull is to swing the arms (48) on the film (10) whereby the claws (49) are engaged in the perforations of the film. Further continued movement of the pitman (44) causes the head (45) to slide upwardly on the guide rods (46) with the claws (49) maintained in engagement with the film; so that the film therefore is lifted during the time when the stud (43) is passing from its lowermost position to its upper position, relatively to the shaft (30). Immediately as the stud (43) starts on its downward travel the spring or pitman (44) is under compression, whereby a thrust is now exerted against the extensions (48a) and in view of the released pressure between the claws (49) and the film perforations, the first effect of the downward movement is to withdraw the claws (49) from the film and further continued movement carries the head (45) and actuating parts to lowermost position, with the claws (49) out of contact with the film. This motion begins prior to any exposure of the film through the aperture (32) of the shutter (31) and terminates after the aperture (32) has passed beyond the position to expose the film; so that during the passage of the aperture (32) the film is stationary and is fed during the time when the member (31) is effective as a shutter.

Figs. 6 and 7 illustrate a slightly modified arrangement of the winding mechanism within the film magazine in which modified structures considerable portions of the film being wound are in contact with a considerable portion of the film being unwound; so that an effective coaction is maintained between the unwinding and the rewinding coils.

The invention as herein shown and described may be varied in many of its essential features without departing from the spirit of the invention.

What I claim and desire to secure by Letters Patent of the United States is—

1. A moving picture machine comprising a film operating casing including a shutter, means for operating said shutter, film feeding devices having the effective portions thereof extending through an opening in the rear of said casing, a film magazine independent of said casing and adapted to be fitted to said casing, a shutter slide mounted in the forward portion of said film magazine and adapted to be withdrawn when said film magazine is attached to said casing, an opening in said film magazine through which said film feeding members are adapted to operate when said shutter slide is withdrawn, and means within said film magazine for causing the winding and unwinding of the said film.

2. In a device of the character described a casing constructed to carry a suitable lens, a shutter adapted to intercept the light from said lens at predetermined intervals, film feeding mechanism carried by and mounted within said casing and having effective portions extending through an opening in the rear portion of the said casing, in combination with a detachable film magazine adapted to coöperate with and be secured to said casing and to completely carry the entire length of film, an opening being provided in said film magazine to permit the effective operation of said film feeding devices, means within said magazine adapted to carry a film and to guide said film with a portion thereof adjacent the zone of operations of said film actuating mechanism, and means whereby the movement of the film effects the unwinding and rewinding thereof.

3. In a device of the character described a casing constructed to carry a suitable lens, a shutter within said casing and adapted to intercept the rays of light from said lens at a predetermined interval, film feeding devices operably connected to operate in synchronism with the operation of said shutter, in combination with a detachable film carrying magazine constructed to be attached to said casing and to completely carry all the film, means being provided whereby said film feeding mechanisms are operative to intermittently move the film within said magazine, and winding mechanism provided for said film whereby the movement of the film through said actuating devices automatically unwinds and rewinds said film.

4. In a device of the character described a lens, a shutter constructed to coöperate with said lens, film feeding mechanism, in combination with detachable means to completely carry and guide a film within the zone of effective operations of said film feeding mechanism, and film supporting devices adapted to cause the movement of said film to automatically unwind and rewind the said film.

5. In a device of the character described a suitable lens, a shutter operating with said lens to intercept the light therefrom at predetermined intervals, film feeding devices operating in synchronism with said shutter, in combination with a detachable film supporting means whereby the portion of the film being unwound is maintained in contact with the portion of the film being rewound to cause the movement of the film to automatically unwind and rewind the said film, and a casing for said means, which casing comprises a portion of the exterior casing of the device.

6. A device of the character described comprising a suitable lens, a shutter coöperating with said lens to intermittently intercept the light passing through said lens, a film feeding mechanism operating in synchronism with said shutter, in combination with film guiding devices operative to guide a portion of the film adjacent the zone of effective operations of the film feeding mechanism, a detachable casing supporting said film-guiding devices and adapted to comprise a portion of the exterior casing of the said device, and means whereby a contact under pressure is maintained between the coil of unwound film and the coil of rewound film whereby the movement of the film causes the winding and rewinding to be automatically performed.

7. In a moving picture machine a suitable lens, a shutter operative in connection with said lens to intermittently intercept the light passing through said lens, film operating mechanism adapted to intermittently move a film to expose individual picture lengths thereof, a casing inclosing and supporting the film-operating mechanism, in combination with film guiding devices adapted to maintain a portion of a film within the effective zone of operations of said film feeding devices and a second casing adapted to be attached to and detached from the first-mentioned casing, said second casing inclosing and supporting the guiding devices, and film winding mechanism including means constructed to maintain the peripheries of the wound and unwound coils of film in contact under pressure whereby the rewinding of the film is automatically produced by the unwinding thereof.

In testimony whereof I have hereunto signed my name in the presence of two subscribing witnesses.

WILLIAM M. THOMAS.

In the presence of—
 MARGUERITE THOMAS,
 E. E. HAINES.